United States Patent [19]

Silverbrook

[11] Patent Number: 5,793,345
[45] Date of Patent: Aug. 11, 1998

[54] DYNAMIC REFINEMENT OF PIXELS FOR A DISPLAY

[75] Inventor: Kia Silverbrook, Leichhardt, Australia

[73] Assignee: Canon Kabushiki Kaisha, Tokyo, Japan

[21] Appl. No.: 402,496

[22] Filed: Mar. 13, 1995

[30] Foreign Application Priority Data

Mar. 11, 1994 [AU] Australia .................................. PM4402
Mar. 11, 1994 [AU] Australia .................................. PM4413

[51] Int. Cl.$^6$ .................................................. G09G 3/36
[52] U.S. Cl. ........................... 345/89; 345/97; 345/149
[58] Field of Search ............................. 345/88, 89, 97, 345/98, 100, 103, 147, 149, 152; 357/56

[56] References Cited

U.S. PATENT DOCUMENTS

| 4,850,677 | 7/1989 | Okumura | 345/89 |
|---|---|---|---|
| 4,864,290 | 9/1989 | Waters | 345/89 |
| 4,964,699 | 10/1990 | Inoue | 345/98 |
| 5,119,084 | 6/1992 | Kawamura et al. | 340/784 |
| 5,124,695 | 6/1992 | Green | 345/103 |
| 5,296,870 | 3/1994 | Nicholas | 345/149 |
| 5,347,393 | 9/1994 | Van Haaren et al. | 345/89 |
| 5,404,236 | 4/1995 | Hartmann et al. | 345/89 |
| 5,499,037 | 3/1996 | Nakagawa et al. | 345/103 |
| 5,561,476 | 10/1996 | Kershaw et al. | 345/100 |
| 5,576,731 | 11/1996 | Whitby et al. | 345/100 |

FOREIGN PATENT DOCUMENTS

| 0526135 | 2/1993 | European Pat. Off. . |
|---|---|---|
| 0573822 | 12/1993 | European Pat. Off. . |

*Primary Examiner*—Steven Saras
*Assistant Examiner*—David L. Lewis
*Attorney, Agent, or Firm*—Fitzpatrick,Cella, Harper & Scinto

[57] ABSTRACT

Due to increasing resolution of display technology, it is necessary to drive an individual line of a display at an ever increasing rate. The present invention discloses a display having a pixel arrangement (1, 70) which can be driven in a number of different modes. In a first mode, substantially all of the common lines (55, 71-73) of a line of pixels are simultaneously driven. In a second mode the common lines (55, 71-73) of the display are driven independently. This allows a single line of a display, having a pixel arrangement as disclosed, to be driven at a number of different speeds depending on the necessary speed of update. Particular examples are disclosed with reference to a ferroelectric liquid crystal form of display.

16 Claims, 18 Drawing Sheets

Blue Colour Filter Mask

Green Colour Filter Mask

Red Colour Filter Mask

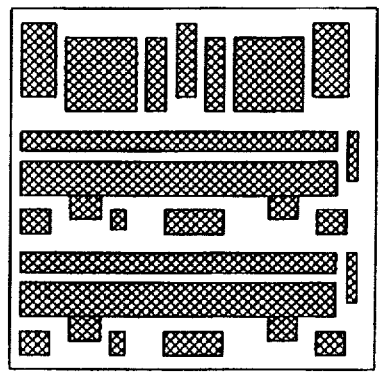
Fig. 10 Data Level transparent electrode Mask
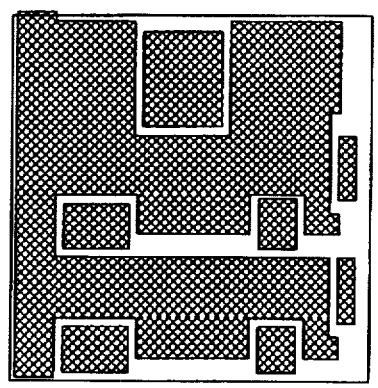
Fig. 12 Common ITO
Fig. 9 Data metal
Fig. 11 Common metal
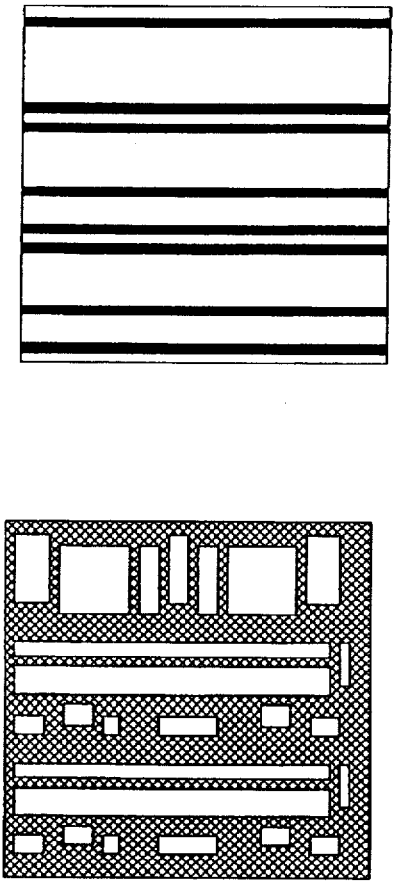
Fig. 8 Contrast enhancement

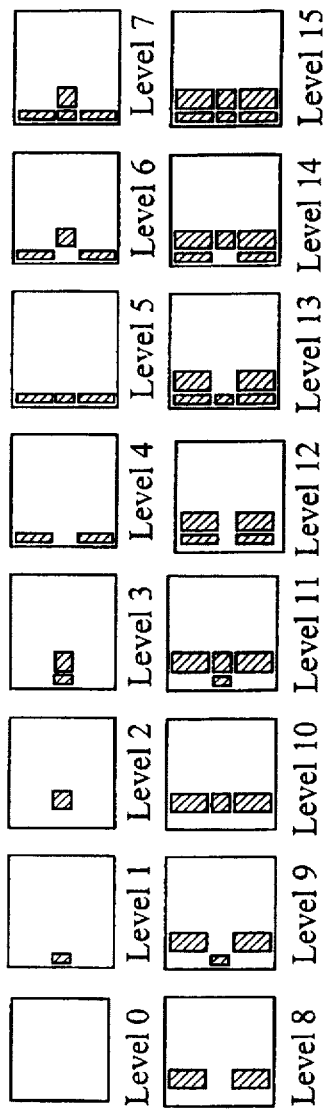
The sixteen levels of red within a pixel
Fig. 15
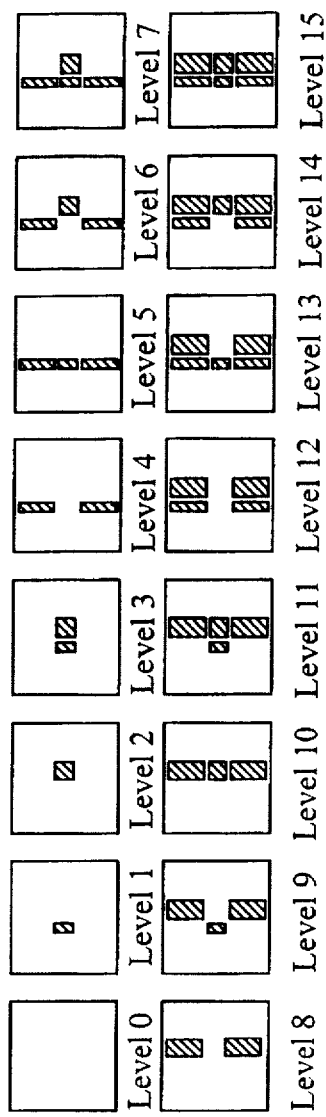
The sixteen levels of green within a pixel
Fig. 16
The sixteen levels of blue within a pixel
Fig. 17

DYNAMIC REFINEMENT OF PIXELS FOR A DISPLAY

The present invention relates to the display of images on a color display apparatus such as a color computer display and, in particular, to the display of color images on a discrete level raster color display apparatus.

The display of images on devices such as Cathode Ray Tubes (CRT) and liquid crystal displays (LCD) is a known art. High resolution color CRT or LCD display devices in common use for the display of images are capable of displaying in the order of 1024 lines with 1280 pixels on each line with each pixel consisting of a red, green and blue components contributing the intensity level of that pixel on the surface of the CRT or LED. Additionally, common standards in use assume a refresh rate of the display generally above 25 Hz and commonly 60 Hz.

An image is normally formed on the particular display by utilizing the persistence on a fluorescent screen (CRT) or utilizing a transmittance change of a crystal element (LCD). The impression made by the light received by the eye from the screen persists for a small fraction of a second after the source is removed. In presenting many frames to the eye over each second, the eye integrates between each frame and there is created an illusion that the images are being displayed in a continuous fashion. To create the illusion of motion, sufficient complete frames must be shown during each second so that the eye will continually integrate between them. It has been found that this effect can normally be produced by having a picture repetition rate greater than about 16 frames per seconds.

The rate of 16 frames per second, however, is not rapid enough on CRT type devices to allow the brightness of one picture to blend smoothly into the next when the screen is darkened between frames. At this rate the screen will appear to 'flicker' if the image written on the screen does not have a long 'persistence' between frames. In common CRT type screens, the persistence normally lasts for only a very short interval and decays very rapidly before it is written again by the next frame which is to be displayed. In an LCD type display, the element is chosen to have a relatively short response time to also simulate the effect of a CRT with a short persistence. Hence these devices often produce flicker if used at a low refresh race.

It has been found that a picture repetition rate below 30 frames per second is generally not rapid enough to overcome flicker at the light levels produced by a CRT screen. One standard method adopted to overcome this problem is interleaving or interlacing, whereby different portions of the image are displayed in an interleaved nature. However, this method does not overcome a fundamental problem in that, as the number of pixels to be displayed is increased, the time available for the display of each pixel becomes increasingly limited. For example, in the case of a system with a 1280 (lines)×1024 pixel display and a frame frequency of 30 Hz, the time to display a single pixel, ignoring any horizontal or vertical flyback time, is approximately:

pixel time=1/1280 lines×1024 pixels×30 Hz=25.4 nanoseconds

As this is the maximum time available to change the color value of a particular pixel, the color displayed by each pixel element must be capable of being changed within this short time if the display is to faithfully reproduce an intended input image which is subject to change over time.

This interval is extremely short and, if the resolution of the display device is increased, the period becomes even more accentuated. For example, an increase of resolution to 1920 lines×2560 pixels would result in a time to display each pixel being reduced to about 6.78 nanoseconds. The response time of each pixel of the display device must be able to keep up with this shortened time.

In recent years, Clark and Lagerwall have proposed a ferroelectric liquid crystal device (FLCD) having a high speed responsive characteristic and a memory characteristic. U.S. Pat. No. 4,964,699 (Inoue) entitled 'Display Device', proposes a ferroelectric liquid crystal element display device (FLCD).

Display devices such as FLCD displays are normally defined to have a predetermined number of lines with each line consisting in turn of a predetermined number of pixels. In order to address a portion of a particular pixel, horizontal common lines and vertical drive lines are provided. The intersection of a particular horizontal common line and vertical drive line occurs at a particular pixel of interest. Therefore, to set a particular pixel to a predetermined state, the corresponding lines are driven, in a manner known to those skilled in the art, to set the pixel to that state.

As an extension, each pixel can be provided with a number of drive lines controlling different portions of a pixel. For example, in a color display having Red, Green and Blue primary colors, separate drive lines can be used for the Red, Green and Blue portions of a particular pixel respectively. Additionally, each primary color can have a number of drive lines to drive a number of portions of each primary color of a pixel.

In order to increase the time required to drive each pixel, it is known to drive a whole line of pixels simultaneously. This simultaneous driving can be implemented by driving one common line, while simultaneously driving all the drive lines for that particular line, thereby increasing the amount of time available to set each pixel value to a predetermined setting. The time available for setting a particular pixel will therefore be increased by the number of pixels on a particular line.

It has been found that, using such techniques, all the pixels of higher definition FLCD displays having, say, in the order of 1,024 lines by 1,280 pixels can be driven at a rate of approximately 8–10 Hz. As previously outlined, the frame rates for full motion are substantially greater than this. Hence, for the higher resolution required of modern computer and television displays, the response time of the ferroelectric element is insufficient to enable a high-speed ferro-electric display to display images at standard rates and resolutions such as the NTSC standard rate or even rates lower than this standard. This problem is, of course, accentuated when the resolution of the display is increased. One method which could be used to overcome this problem is to only update those portions of the screen on which motion is occurring at any one particular time, utilizing the memory characteristics of the display for those portions of the screen that are not being updated.

In relation to the memory characteristics of the ferroelectric form of display, it has been further found that the pixel elements maintain their state for a substantial period of time after being set to a particular state. Although this period of time can vary in practice, periods up to several hours have been measured, with displays with persistence levels in the order of minutes being produced.

It should be noted that the present invention is not limited to displays of the ferro-electric type and extends to any form of display wherein the illuminated pixels have a "memory characteristic". By memory characteristic, it is meant that, once a pixel is set to a certain state, it is maintained in that state for an extended period of time or until such time as it is set to another state. A display having a memory characteristic is to be compared with a CRT type display wherein each pixel of the display, once illuminated, undergoes a rapid decay in brightness and must be again illuminated in the next frame. It will be evident to those skilled in the art that displays having a memory characteristic will include not just ferro-electric liquid crystal displays but certain forms of thin film transistor (TFT) liquid crystal displays, certain forms of plasma displays, and certain forms of electro luminescent displays.

It is an object of the present invention to provide for an increased resolution capability for a discrete level display while simultaneously maintaining an acceptable level of update speed.

In accordance with one aspect of the present invention there is provided a discrete level display having a plurality of pixels, each pixel having a plurality of drive lines and a plurality of common lines, said panel having at least two pixel update states including:

a motion update state wherein a plurality of said common lines of said pixel are able to be driven in unison; and a refining update state wherein said common lines of said pixel are able to be driven independently.

In accordance with a second aspect of the present invention there is provided a method of updating a discrete level display, said display having a plurality of pixels, each pixel having a plurality of drive lines and a plurality of common lines, said method comprises entering a motion update state when motion in the pixels of an input image in excess of a first predetermined minimum motion is detected and driving a multiplicity of said common lines corresponding to said pixels in unison, entering a refinement update state when motion less than a second predetermined minimum motion is detected and refreshing said pixels by driving said common lines independently.

Two embodiments of the present invention will now be described with reference to the accompanying drawings in which:

FIG. 8 illustrates a contrast enhancement mask used in fabrication of the pixel layout of FIG. 1.

FIG. 9 illustrates the data metal layer mask used in fabrication of the pixel layout of FIG. 1.

FIG. 10 illustrates the data level transparent electrode mask used in the formation of the data level transparent electrode layer of the pixel layout of FIG. 1.

FIG. 11 illustrates the common level metal mask used in the construction of the common level metal layer of the pixel layout of FIG. 1.

FIG. 12 illustrates the common electrode mask used in fabrication of the pixel layout of FIG. 1;

FIG. 15 illustrates the number of possible levels available for the red portions of a pixel;

FIG. 16 illustrates the number of green levels available with the pixel arrangement of the second embodiment;

FIG. 17 illustrates the number of blue levels available with the pixel arrangement of the second embodiment;

Although the preferred and other embodiments of the present invention will be described utilizing the ferro-electric liquid crystal display form of technology, it will be evident to those skilled in the art that the present invention is not limited thereto and can readily extended to other forms of display having a memory characteristic where it is desired to increase the speed with which updates occur for said display.

Figure 1:
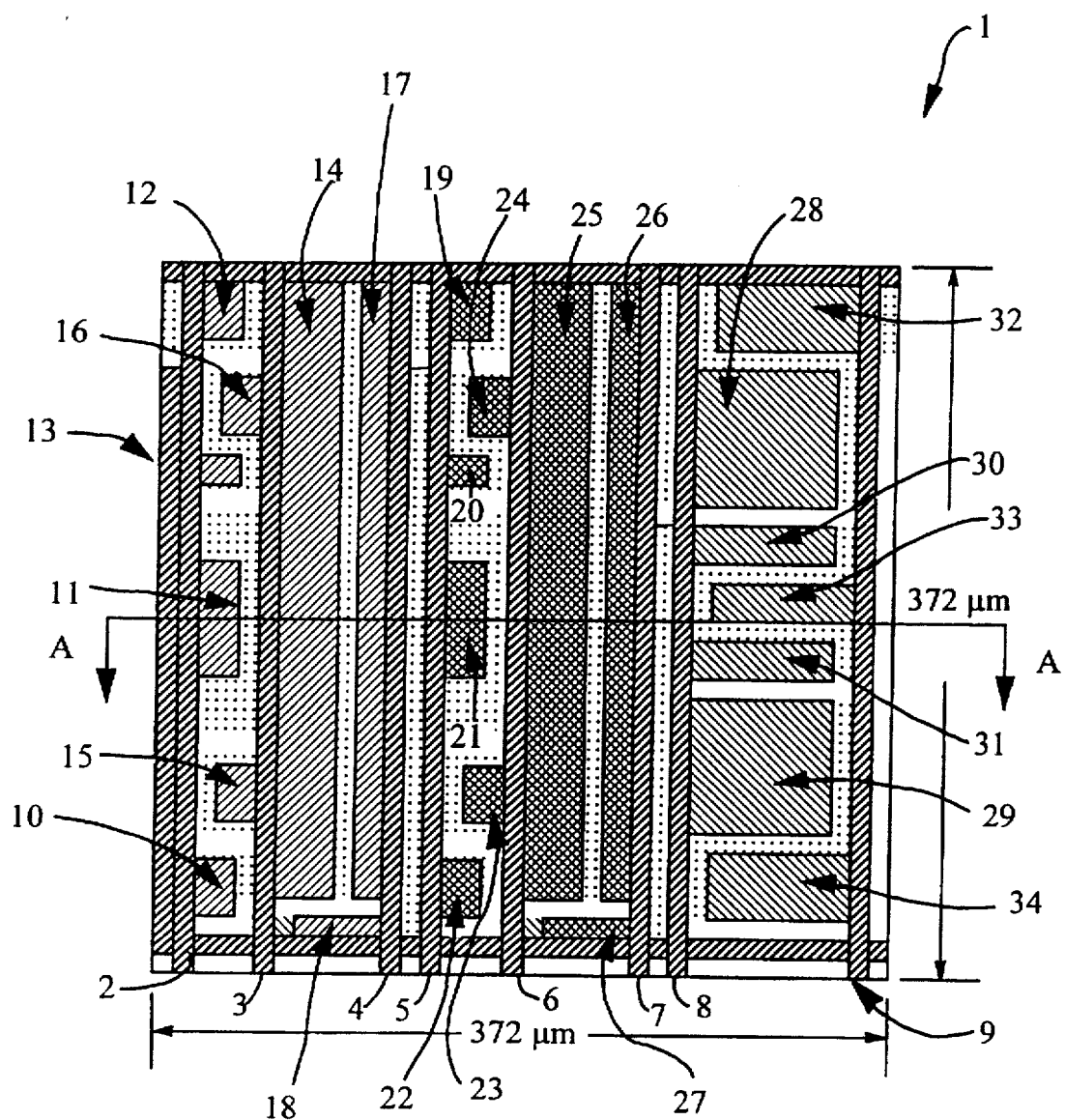
FIG. 1 illustrates a schematic plan view of a pixel layout of the first embodiment of the present invention.

Referring now to FIG. 1 there is shown a pixel layout 1 in accordance with a first embodiment of the present invention. This layout includes eight drive lines 2–9 for each pixel. These drive lines are divided in the proportions of three drive lines for red, three drive lines for green and two drive lines for blue. Each primary color is divided into a number of subpixel areas. Preferably these subpixel areas form a binary relationship in their luminance and the number of drive lines allocated to each primary color is preferably substantially weighted in accordance with that colors luminance. For the purposes of discussion of the preferred embodiment, it is assumed that the luminance of a subpixel area is proportional to its area of illumination. Preferably, each drive line controls one or more areas or pixel portions of the picture, with the pixel portions corresponding to single drive lines being substantially optically balanced at least in the vertical direction. Optical balancing is the term used for describing the process of ensuring that the center of illumination at each output level of illumination remains substantially constant. In the pixel layout of FIG. 1, an attempt has been made to ensure that those portions of the pixel illuminated at any particular level have a balanced center of illumination in the vertical direction about the mid point of the pixel. For example, as will be seen hereinafter, the two pixels areas 10,12 are always illuminated together, thereby having a center of illumination at the mid point of these two areas.

Greater control of the individual pixels is achieved by providing two common lines for each pixel. This has the effect of increasing the number of independently controllable subpixel areas of illumination by a factor of two, and, in the present example, from 8 to 16.

Normally, doubling the number of common lines would half the update speed of the panel as a result of the need to drive the increased number of common lines. However, by using a process of dynamic refinement, the same speed of update is maintained with an initial loss of quality which is immediately restored once the motion in the picture is reduced below a predetermined threshold.

In the preferred pixel layout, each data drive line 2–9 is used to control two distinct subpixel areas of illumination.

Data drive lines 2, 3, 4 are utilized in driving the red portions of a pixel, data drive lines 5, 6, 7 drive the green portions and data drive lines 8, 9 drive the blue portions of a pixel.

The first drive line 2, is used to control subpixel areas 10, 11, 12 and 13 with portions 10, 11, 12 being activated by a first common line and portion 13 being activated by a second common line.

The second drive line 3, is used to control pixel portions 14, 15 and 16 with the portion 14 being activated by one common line and the portions 15, 16 being activated by the other common line.

The third drive line 4 is connected to control pixel portions 17 and 18 with each portion being activated by a different common line.

The fourth drive line 5 is connected to control pixel portions 19, 20, 21 and 22 with portions 19, 21 and 22 activated by one common line and portion 20 activated by a different common line.

The fifth drive line 6 is connected to control pixel portions 23, 24 and 25 with portion 25 activated by one common line and portions 23 and 24 activated by a different common line.

The sixth drive line 7 is connected to control pixel portions 26 and 27 with each portion being activated by a different common line.

The seventh drive line 8 is connected to control pixel portions 28, 29, 30 and 31 with the portions 28 and 29 connected to one common line, and the portions 30 and 31 connected to the other common line.

Finally, the eighth drive line 9 is connected to control pixel portions 32, 33 and 34 with portions 32 and 34 connected to one common line and portion 33 connected to the other common line.

It can be seen that each drive line is responsible for controlling two subpixel portions having the same color, the first being those activated by the first common line and the second being those controlled by the second common line. Preferably, each of the areas which are independently drivable are binary weighted with, in the present example, the green drive lines being divided into 6 subpixel areas. These areas are weighted in the ratio of 32:16:8:4:2:1.

For example, the first green drive line 5 is capable of driving a first sub pixel area comprising 19, 21, 22 and a second subpixel area 20 that have areas in the ratio of 16:2. The second green drive line 6 is capable of driving a first sub pixel area 25 and a second sub pixel area comprising 23, 24 which have areas in the ratio 32:4. The third green drive line 7 is capable of driving a first sub pixel area 26 and a second sub pixel area 27 which have areas in the ratio 8:1. The same system is adopted with the red portion of the pixel which also has three drive lines.

With the blue portion of the panel, there are only two drive lines 8 and 9. The first blue drive line 8 is used to drive a first sub-pixel area comprising 28 and 29 and a second sub-pixel area 30, 31. These two subpixel areas are apportioned in a ratio of 32:8 respectively. The second blue drive line 9 controls a first subpixel area comprising areas 32 and 34, and a second subpixel area comprising area 33. These two subpixel areas are apportioned in the ration 16:4 respectively.

The process of dynamic refinement involves driving a display incorporating pixels 1 in three modes being a motion update mode, a refining update mode and a background update mode.

Motion Update Mode

When motion occurs in the image input to the display, a motion update state is entered. In this state both common lines of a particular line of the display are driven simultaneously. As a result, the panel is able to operate at the full speed of updating that it would operate at when the number of common lines halved. When operated in this mode, the panel has the characteristic of being a binary weighted 36:18:9 pixel for the red and green primary colors and a binary weighted 40:20 pixel for the blue primary colour. Therefore, in motion update mode, 8 levels are provided for red and green and 4 levels are provided for blue.

Refining Update Mode

Once the amount of detected motion is below a predetermined threshold, a refining update mode is entered. In this mode, the two common lines for each pixel updated during the motion update mode are driven independently, thereby substantially increasing the number of levels that each primary color can produce. For example, the red and green sub-pixel areas, with their 32:16:8:4:2:1 weighted areas can produce 64 separate levels each, and the blue pixel sub areas with the weighting of 32:16:8:4 can produce 16 different possible levels.

Figure 2:
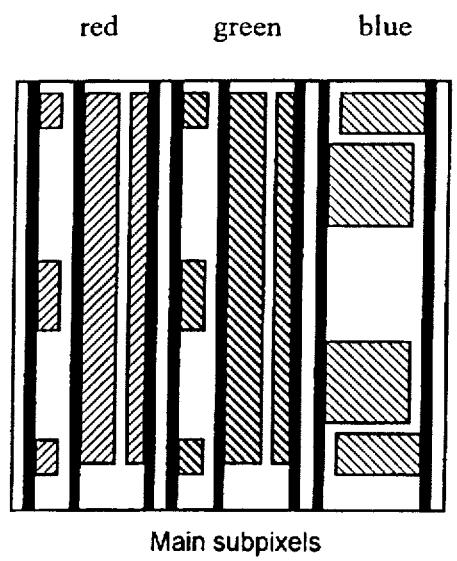
FIG. 2 illustrates a first set of subpixels to be driven in the refining update mode with the first embodiment of the present invention.
Figure 3:
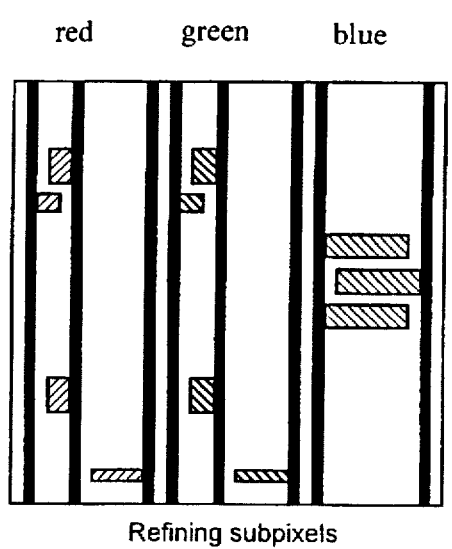
FIG. 3 illustrates a second set of subpixels to be driven in the refining update mode with the first embodiment of the present invention.

This can be seen in FIG. 2 & FIG. 3 wherein FIG. 2 shows the main pixels that are driven in the refining update mode utilizing a first common line and in FIG. 3 there is shown the refining pixels to be driven in the refining update mode utilizing the second common line.

Background Update

Once the motion of the screen has ceased, the panel can be continuously fully refreshed until motion is again detected in the input by driving all the common lines individually in a predetermined sequence. This has the effect of restoring the panel so that it reflects the state of the input data.

Manufacturing

One form of manufacturing a display and having a pixel arrangement 1 will now be described. The manufacturing processes utilized in the display construction are very similar to those used in the construction or fabrication of Very Large Scale Integrated Circuit Devices and familiarity with the construction of such devices is assumed.

Figure 4:
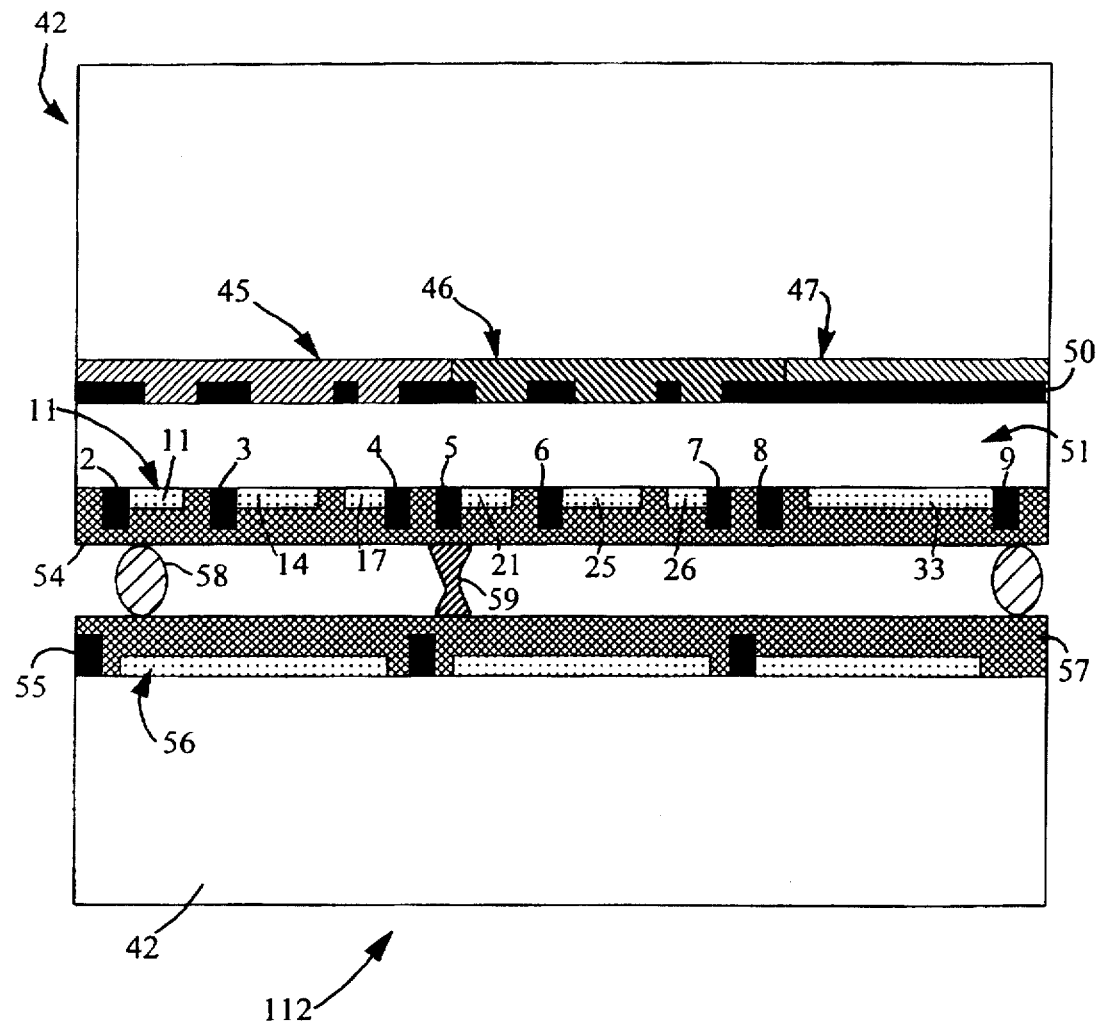
FIG. 4 illustrates a cross-section of a single pixel through the line A—A of FIG. 1.

Referring now to FIG. 4 there is shown a cross section through a single pixel of an FLCD panel 40 along the line A—A of FIG. 1. The construction of a FLCD display begins with the two glass substrates 42, 43. The construction of the top glass substrate 42 can proceed first by the depositing of a color filter layer which comprises a red color filter 45, green color filter 46 and blue color filter 47.

Colour Filters

After the surface of the substrate 42 has been thoroughly cleaned, an aluminium chelate coupling agent (not shown) can be applied to ensure the proper adhesion to the glass of subsequent layers. A spin coating process is then used to apply a 1.5 μm layer of photosensitive polyamide containing a primary colour die, which in the first case will be red. To remove residual solvents, the polyamide is pre-baked for approximately 10 minutes at 80° C.

Figure 7:
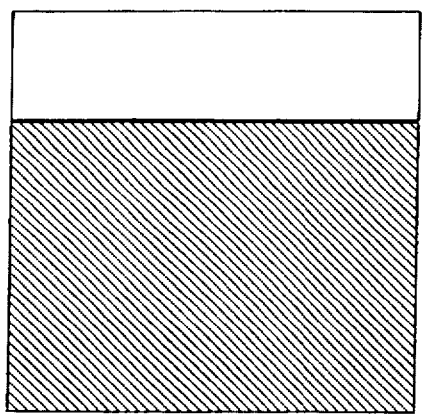
FIG. 7 illustrates a blue pixel mask used in fabrication of the pixel layout of FIG. 1.
Figure 6:
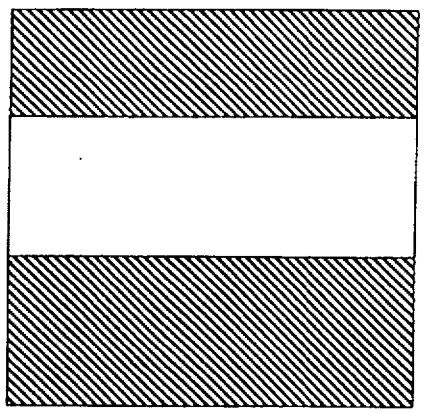
FIG. 6 illustrates a green pixel mask used in fabrication of the pixel layout of FIG. 1.
Figure 5:
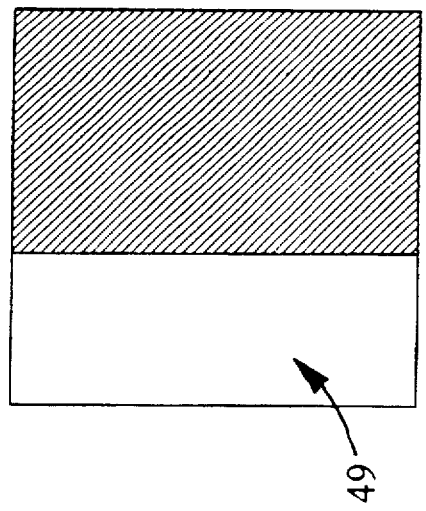
FIG. 5 illustrates a red pixel mask used in fabrication of the pixel layout of FIG. 1.

The photosensitive polyamide is then exposed using a pixel mask as shown in FIG. 5 with the aperture 49 corresponding to the area of the red color filter 45 to be exposed. The polyamide layer is then developed leaving the red color filter portions 45 of each pixel on the substrate 42. The first color filter portion is then post baked to form a stable structure before the process is repeated for the green filter 46 and blue filter 47, with appropriate masks, as shown in FIG. 6 and FIG. 7 respectively, wherein the aperture is appropriately shifted and resized.

Contrast Enhancement Layer

Once the color filter layer has been formed, the next layer to be formed is a contrast enhancement layer 50. This layer is formed through the depositing of a 0.5 μm layer of Molybdenum which is subsequently etched using a contrast enhancement pixel mask as shown in FIG. 8, leaving opaque portions e.g. 50.

As a consequence of the contrast enhancement layer being of a conductive nature, it is necessary to ensure that it is properly insulated from subsequent layers. This can be achieved through the CVD deposition of a 2 μm layer of $SiO_2$ 51 utilizing standard techniques.

Data Level Metal Layer

The next portion of the display device to be constructed is preferably the data level metal layer 2–9. The deposition of this metal layer occurs directly over the layer of $SiO_2$.

In the construction of devices using metal layers, the use of Molybdenum (Mo) has been preferred for the formation of the relevant circuitry. Molybdenum is preferred due to its superior patterning properties and planarization properties. Aluminum is also a possible candidate for use in patterning of the metal layer. The resistivity of aluminum is 0.027 μΩm at 25° C., whereas the resistivity of molybdenum is 0.0547 μΩm at 25° C. Hence a metal conductive layer made of aluminum is almost twice as conductive as one made of molybdenum. However, hillock or spike formation in aluminum as a result of stress release during differential thermal expansion of aluminum in comparison with other substances used in the creation of the display, creates a serious problem with prior forms of displays which currently prevents the use of aluminum.

The deposition of a metal layer is well known to those skilled in the art of semiconductor circuit fabrication and an example process for such deposition will now be described. A 0.3 μm layer of a Aluminum and 0.5% Copper (AlCu) alloy is first sputtered onto the surface of the substrate. Preferably the aluminum is planarized to a 0.09 μm surface height difference. The sputtered aluminum layer is then primed for photoresist adhesion by spin coating a monolayer of hexamethyldisilazane (HMDS). A 1 μm layer of positive photoresist such as AZ1370 is then spin coated on top of the priming layer. The photoresist is then pre-baked for 3 minutes at 90° C. using an infra-red oven. The photoresist is then exposed using the data level metal mask as shown in FIG. 9 which comprises simple vertical stripes corresponding to the various areas of the data metal layer. The photoresist is exposed to the metal mask at 35 $MJ/cm^2$.

The photoresist can then be developed for 50 seconds at 23° C. in 25% aqueous solution AZ-351 and 40% aqueous solution AZ-311. A development inspection can then take place before the resist is stripped and any out of tolerance panels are either discarded or reworked. The photoresist can then be post-baked at 150° C. before the sputtered aluminum is wet etched in an agitated solution of 80% phosphoric acid, 5% nitric acid, 5% acetic acid and 10% water at 40° C. for 2 minutes.

Finally the remaining photoresist is stripped using a low phenol organic stripper such as Shipley 'Remover 1112A', leaving the data level metal layer 2–9 on the top substrate 42.

Data Level Transparent Electrode Layer

The next layer to be formed is the data level transparent electrode layer 11, 14, 17, 21, 25, 26, 33. This layer is formed by depositing a transparent electrode such as Indium Tin Oxide (ITO) on the substrate 42.

The process of formation includes the sputtering of indium and tin in an oxygenated atmosphere to initially form a 0.07 μm layer of ITO. This layer of ITO is then primed, again by spin coating a monolayer of HMDS. On top of this layer is spin coated a 1 μm layer of positive photoresist such as AZ1370. The photoresist can then be pre-baked to remove solvents for approximately 3 minutes at 90° C. using an infra-red oven.

The photoresist is then exposed to the data level electrode mask as shown in FIG. 10 at an energy of approximately 35 $MJ/cm^2$. The photoresist is developed for 50 seconds at 23° C. in a 25% aqueous solution AZ-351 and a 40% aqueous solution AZ311. The photoresist is then post baked at 120° C. The ITO is then wet etched and the remaining photoresist is stripped using a low phenol organic stripper such as Shipley 'Remover 1112A' leaving the data transparent electrode layer connected to the data metal layer.

Surface Layers

The next layer to be applied is a surface protective layer 54. This layer can include the sputtering of 0.1 μm of a tantalum pentoxide insulator, the application of 0.1 μm of silicon titanium oxide, the spin coating of 0.02 μm of polyamide which is then post baked and the surface rubbed for the proper liquid crystal molecule alignment.

Bottom Glass Substrate

After the surface of the bottom substrate 43 has been thoroughly cleaned, the common metal layer 55, the common transparent electrode layer 56 and the surface protection layer 57 are laid down in a similar manner as set out for the corresponding data level layers, with the common metal mask shown in FIG. 11 and the common electrode mask is shown in FIG. 12.

Final Construction

The final construction of the PLCD panel 40 requires the placement of the silicon spacer spheres 58 between the panels. These can be sprayed on the data level substrate to a density of approximately 100 spheres per square millimeter. Similarly, the adhesive droplets 59 are sprayed on the common substrate. An edge bonding adhesive (not shown) can then be applied to the perimeter of the panel before they are joined together and filled with liquid crystal.

The foregoing describes one embodiment of a pixel layout incorporating the present invention. The actual final form of a particular pixel will depend on the particular display technology utilized in construction of the pixels. The first embodiment was described in relation to a ferro-electric liquid crystal form of display wherein the display includes a contrast enhancement layer. Further, the design of the pixel arrangement was such that two common lines were utilised and three data lines for each of the red and green portions of the display, with two data lines utilised for the blue portion of each pixel.

Second Embodiment

Figure 13:
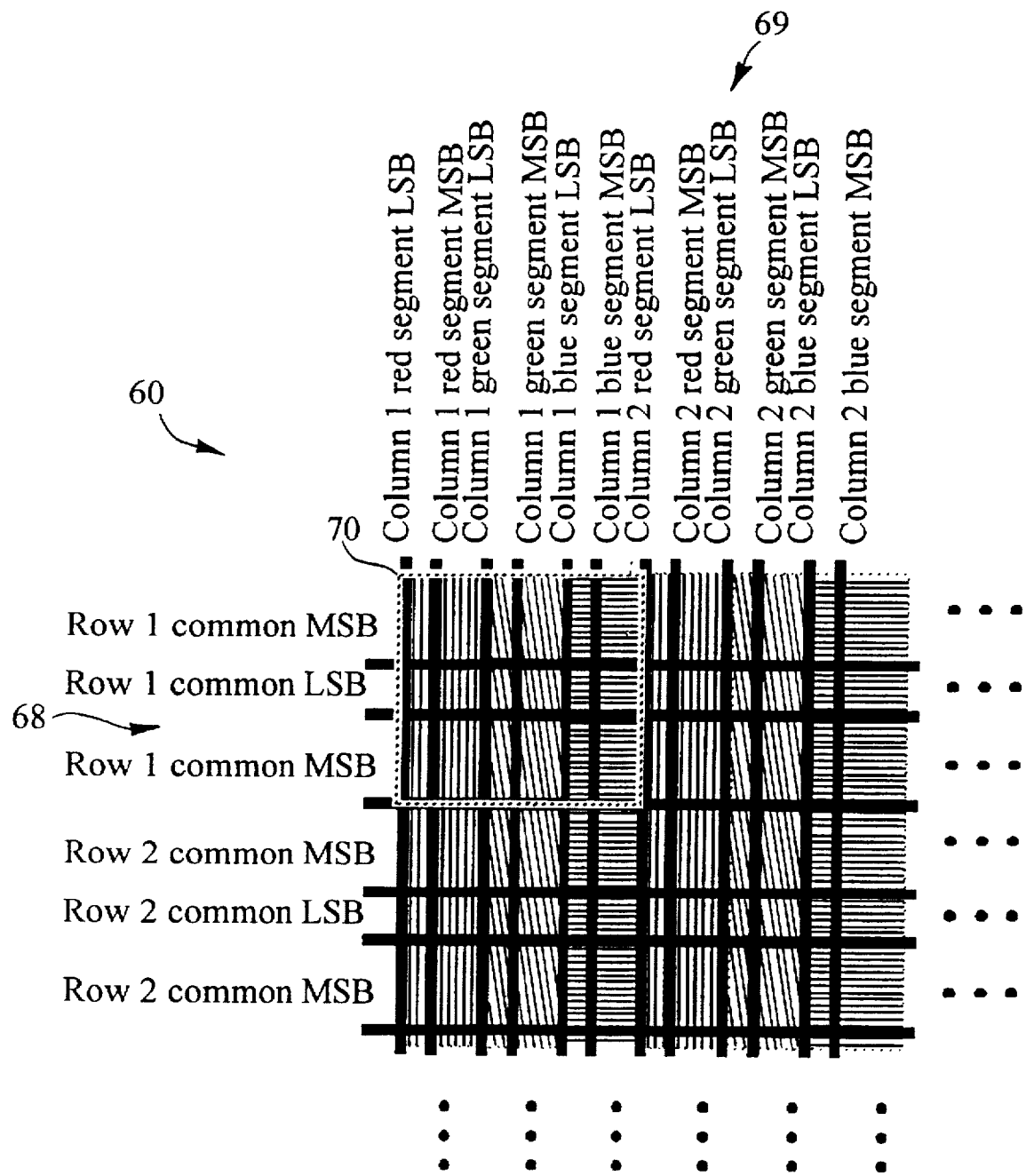
FIG. 13 illustrates an array of pixels constructed in accordance with a second embodiment.

Referring now to FIG. 13, there is shown a portion of a pixel layout of a liquid crystal device 70 according to a second embodiment. The liquid crystal display 70 is designed for the high resolution display of full color images and includes a substantial number of common lines and corresponding common transparent electrodes 68 laid out on a first substrate. The common lines are electrodes laid substantially perpendicular to a large number of data drive lines and data transparent electrodes 69 formed on a second substrate in the manner as will be hereinafter described.

Common sizes for high resolution computer displays included displays having 1024 distinct rows of pixels each divided into 1280 distinct columns of pixels, with one set of lines formed on a first glass substrate and the other set of drive lines formed on a second glass substrate. At the intersection of these rows and columns are formed pixels indicated by the box 70. In the second embodiment of the present invention, each pixel of the display has more than one drive line and more than one common line associated with it.

Figure 14:
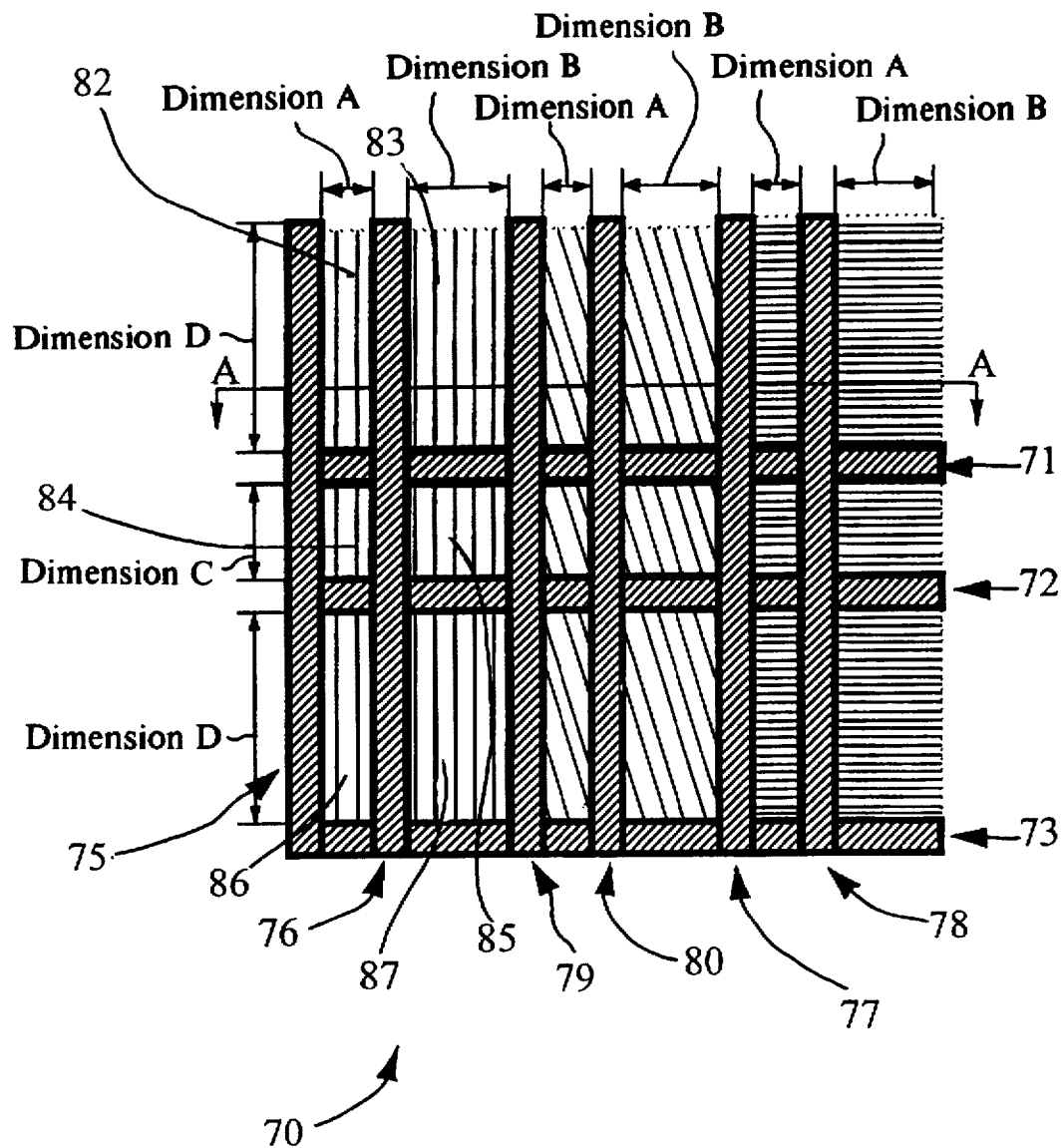
FIG. 14 illustrates a single pixel constructed in accordance with the second embodiment.

In particular, with reference to FIG. 14 wherein there is shown the layout of a single pixel 70, each pixel 70 has three common drive lines 71, 72, 73 with the outer two common drive lines 71, 73 being optionally electrically connected together at the edge of the display. Similarly, each pixel has multiple data lines, divided into red data drive lines 75, 76, green data drive lines 79, 80 and blue data drive lines 77, 78.

The data drive lines are treated symmetrically for each colour and, as such, only 30 the operation of the red data drive lines 75, 76 will now be described. The red data drive lines 75, 76 control the transparent electrode areas 82-87. The first red data drive line 35 controls the transparent electrode areas 82, 84, 86 and the second data drive line controls areas 83, 85 and 87.

Preferably, each transparent electrode area 82-87, which is able to be independently driven, forms a binary area relationship with other areas. For example, area 84 is 1 square unit, area 85 is 2 square units, areas 82 and 86 together form a 4 square unit area, and areas 83 and 87 form an 8 square unit area. Therefore, in driving combinations of the drive lines and the common lines, and remembering that the outer drive lines 71 and 72 are preferably electrically connected together, 16 possible levels for each primary colour of the pixel 70 can be achieved or $16^3=4096$ different colours per pixel 30. Of course, by forming such a binary relationship in illumination areas, substantially more levels can be achieved than if the areas were to be all of the same size.

Referring now to FIG. 15, the 16 possible levels for the red primary color of the pixel 70 are shown. Similarly FIG. 16 and FIG. 17 show the 16 possible levels for the green primary color and the blue primary colour respectively. In combination, each pixel of the preferred embodiment is therefore able to display 4096 different possible colours.

As can be seen from observation of the patterns produced in FIG. 15 to FIG. 17, the optical center or the center of illumination of each primary color, as the primary color's intensity is increased from level to level, remains substantially in the same position. The need to minimize the movement of the optical center of illumination of the pixel intensity as the intensity is increased is an important consideration in the removal of unwanted artifacts in pictures displayed on an FLCD device, and it is primarily for this reason that the two outer common lines have been provided.

However, as discussed previously, the optical centering process has been slightly relaxed in the horizontal direction.

The common lines 71, 72 can be optionally connected together at the edge of the device using a number of methods. The preferable method is to duplicate the logical circuitry and various bonding pads required for the interconnected drive lines and drive both lines with the same decoded signal. Alternatively, the drive lines can be electrically connected on a Tape Antomated Bonding (TAB) flexible Printed Circuit Board (PCB), by using double sided TAB traces.

Manufacturing

Figure 18:
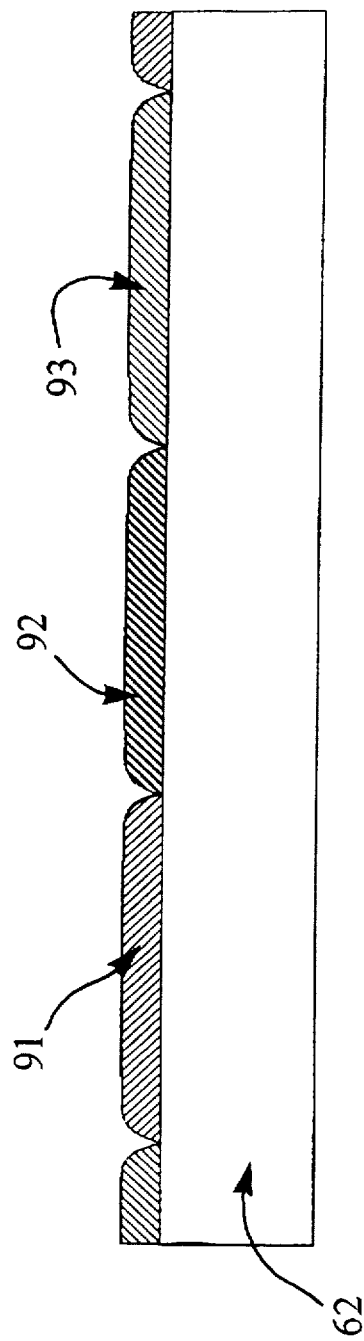
FIG. 18 is a cross sectional view of the construction of the color filter layer of the second embodiment.

The manufacture of a ferroelectric display having a pixel layout in accordance with FIG. 14 will now be described. The construction of a FLCD display begins with the two glass substrates. Referring initially to FIG. 18, the construction of the top glass substrate 62 will now be described.

Color Filters

After the surface of the substrate has been thoroughly cleaned, an aluminum chelate coupling agent (not shown) can be applied to ensure the proper adhesion to the glass of subsequent layers to the glass substrate.

Figure 19:
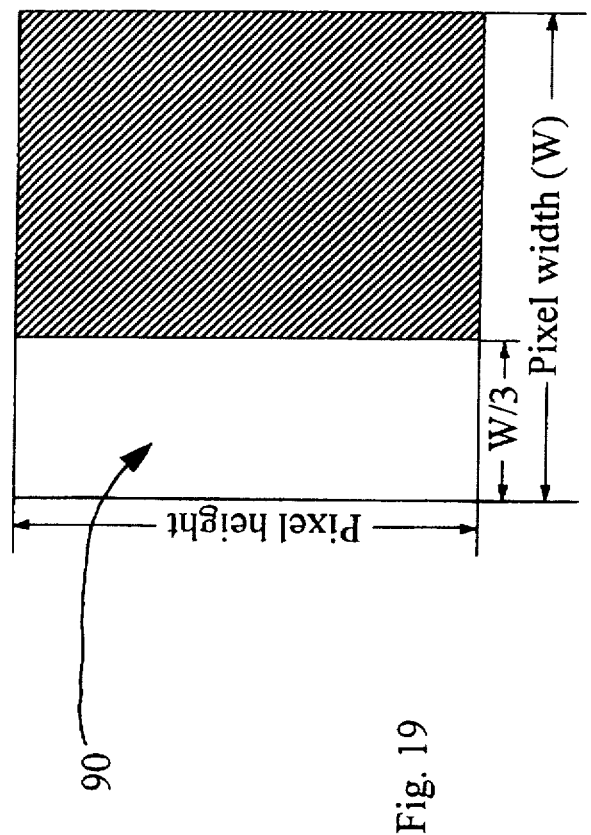
FIG. 19 is a plan view of the color filter mask used in construction of the color filter layer.

A spin coating process is then used to apply a 1.5 μm layer of photosensitive polyamide containing a primary colour die, which in the first case will be red. To remove residual solvents, the polyamide is pre-baked for approximately 10 minutes at 80° C. The photosensitive polyamide is then exposed using a pixel mask as shown in FIG. 19, with the aperture 90 corresponding to the area of the red color filter 91 to be exposed. The polyamide layer is then developed leaving the red color filter portions 91 of each pixel on the substrate 62. This first color filter portion is then post baked to form a stable structure before the process is repeated for the green filter 92 and blue filter 53, with appropriate masks (not shown) whose aperture is appropriately shifted by a one third pixel width.

Data Level Metal Layer

Figure 20:
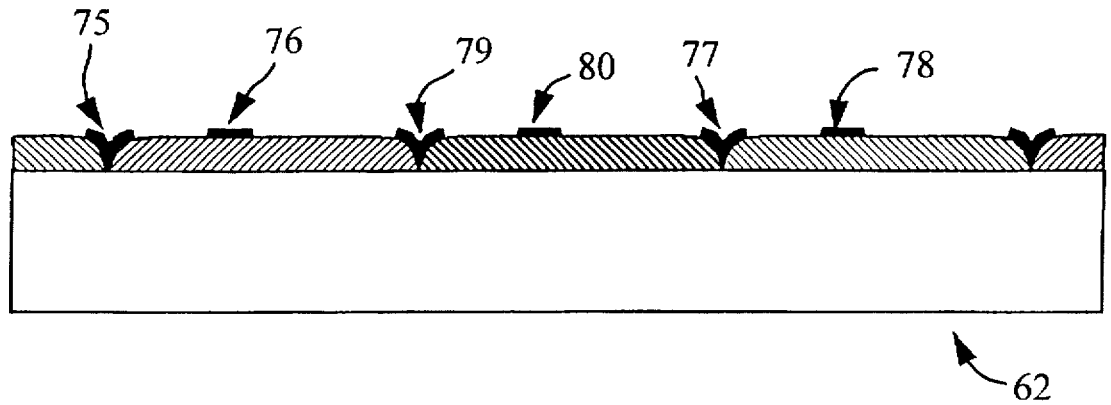
FIG. 20 is a cross sectional view of the construction of the data level metal layer of the second embodiment.
Figure 21:
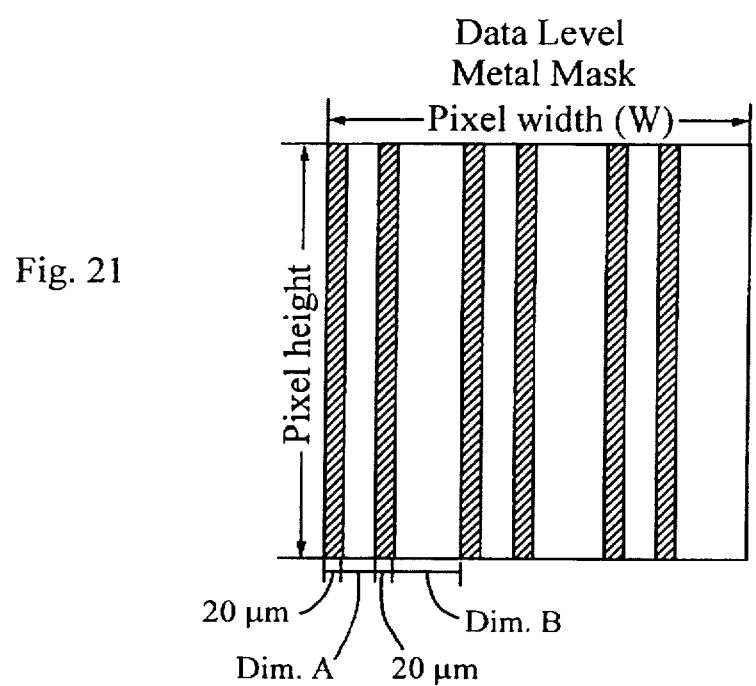
FIG. 21 is a plan view of the data level metal mask used in construction of the data metal layer of the second embodiment.

Referring now to FIG. 20 the next portion of the display device constructed is preferably the data level metal layer 35-40. The deposition of this metal layer occurs directly over the color filters and can be deposited utilizing essentially the same method utilized with respect to the data level layer of the first embodiment but with a pixel mask as shown in FIG. 21.

Data Level Dielectric Layer

Figure 22:
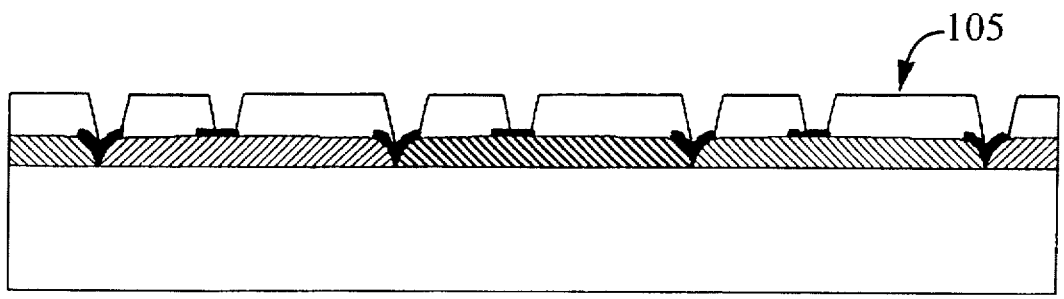
FIG. 22 is a cross sectional view of the construction of the formation of the data level dielectric layer of the second embodiment.

Referring now to FIG. 22, there is shown the data level dielectric layer 105. This layer is formed from a simple photosensitive polyamide process. The processing steps that can be used to form this layer include the spin coating of a 2 μm of a photosensitive transparent polyamide layer. Preferably, a good planarization is obtained through the use of a ester oligomer solvent with 50% resin content rather than the more usual PIQ polyamide acid method.

Figure 23:
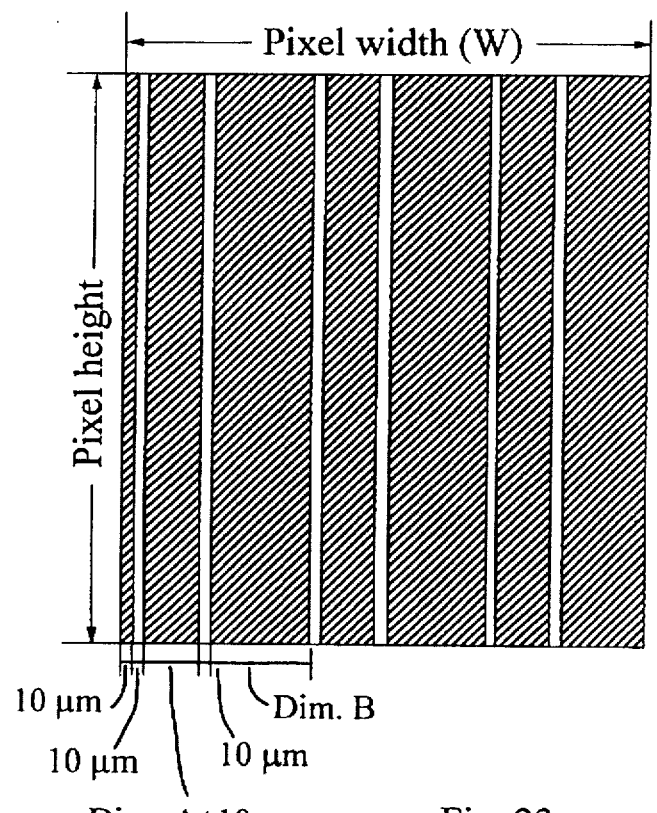
FIG. 23 is a plan view of the data level dielectric pixel mask used in the construction of the data level dielectric layer of the second embodiment.

The polyamide is then prebaked for 10 minutes at 80° C. The polyamide is then exposed using the mask as shown in FIG. 23, before being developed and post-baked to ensure that the final dielectric layer 105 takes the form as shown in FIG. 22.

Data Level Transparent Electrode Layer

Figure 24:
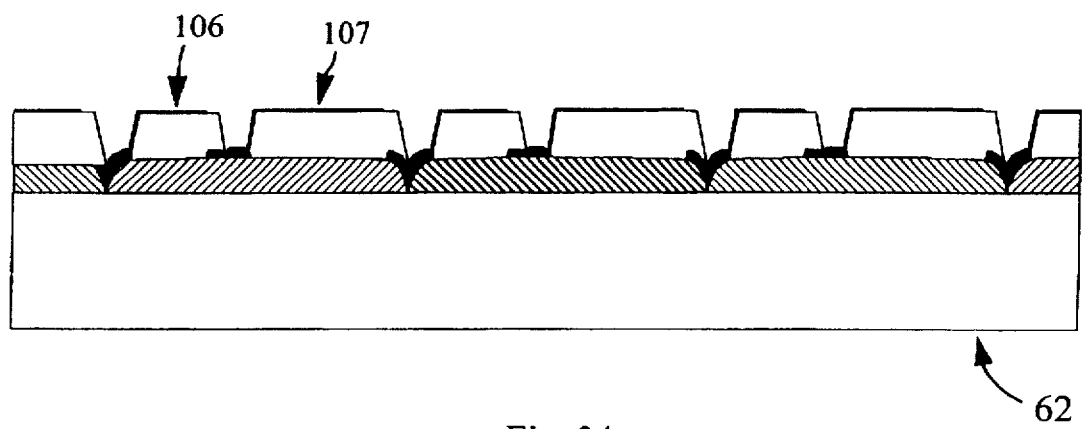
FIG. 24 is a cross sectional view of the constriction of the data level transparent electrode layer of the second embodiment.

Referring now to FIG. 24, there is shown the data level transparent electrode layer including first portions 106, 107 controlling the red primary color area. This layer is formed by applying a transparent electrode such as ITO (Indium Tin Oxide) on the substrate 62.

Although a functional display could be produced with the data level transparent layer being formed initially on the color filter layer and the data level metal layer being formed on top of the data level dielectric layer, the second embodiment includes the data level dielectric layer being created before the data level transparent layer. This has the advantage that the data level transparent layer is created very close to the liquid crystal portion upon which it operates. Hence the electric field created between an adjacent data level transparent electrode and a corresponding common level transparent electrode is substantially increased.

Figure 25:
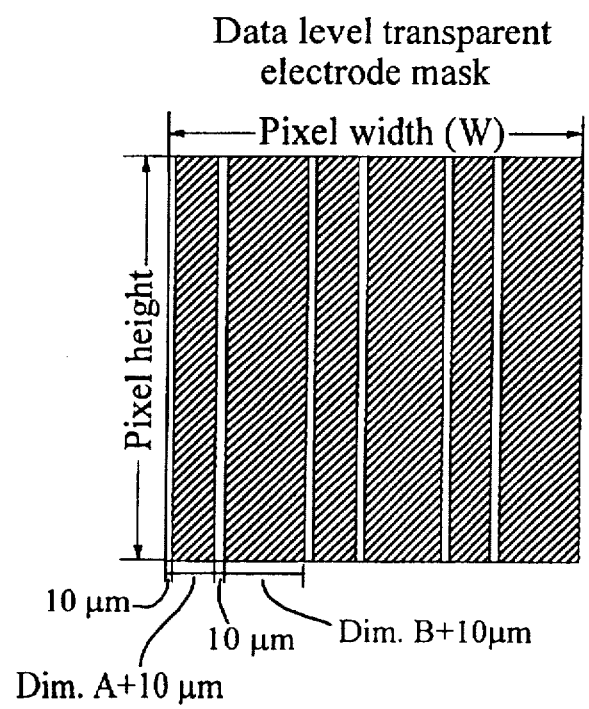
FIG. 25 is a plan view of the data level transparent electrode mask used in the formation of the data level transparent electrode layer of the second embodiment.

The formulation of the data level dielectric layer can be substantially in accordance with that described with reference to the first embodiment with the pixel mask of FIG. 25 being utilized.

Figure 26:
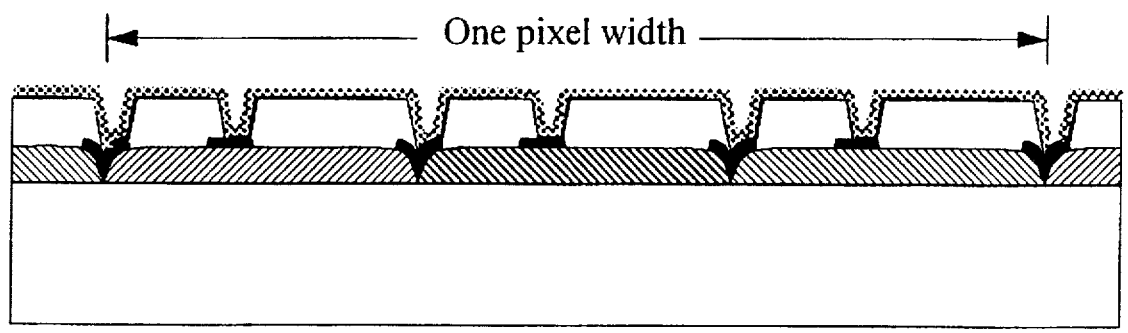
FIG. 26 is a cross sectional view of the construction of the data level surface layers of the second embodiment.

Referring now to FIG. 26, the usual surface layers can then be applied. This includes the sputtering of 0.1 μm of a tantalum pentoxide insulator, the application of 0.1 μm of silicon titanium oxide, the spin coating of 0.02 μm of polyamide which is then post baked and the surface rubbed for the proper liquid crystal molecule alignment.

Figure 27:
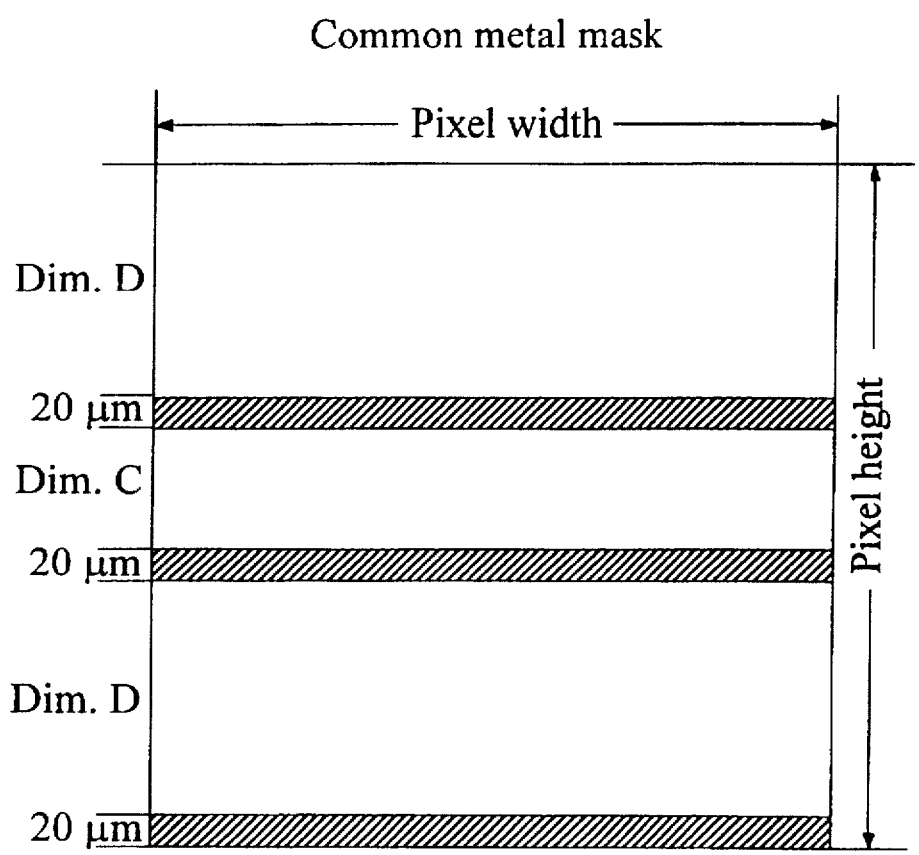
FIG. 27 is a plan view of the common level metal mask used in the construction of the common level metal layer.
Figure 28:
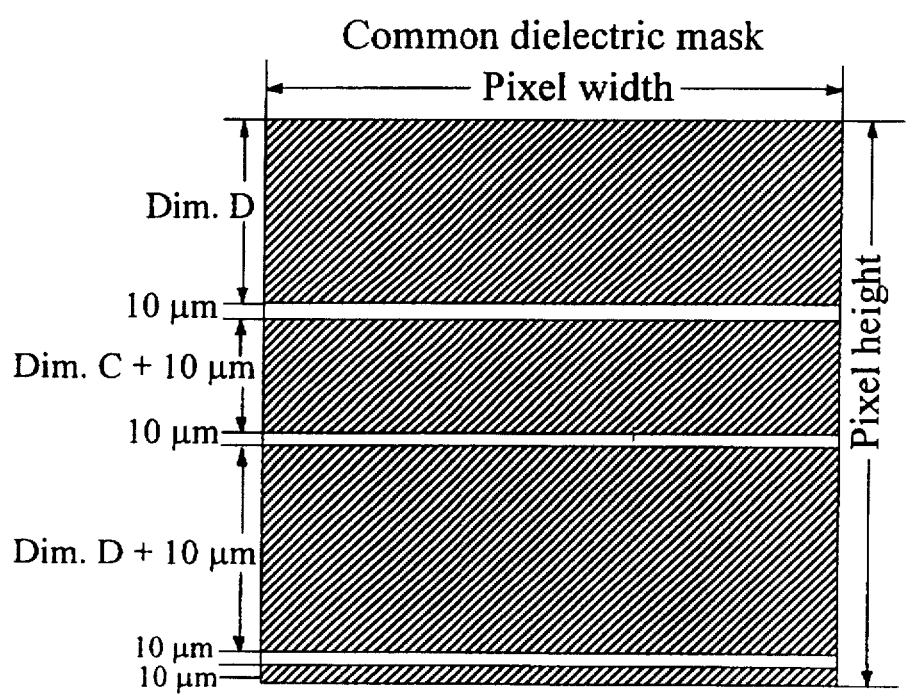
FIG. 28 is a plan view of the common level dielectric mask used in the construction of the common dielectric layer of the preferred embodiment.
Figure 29:
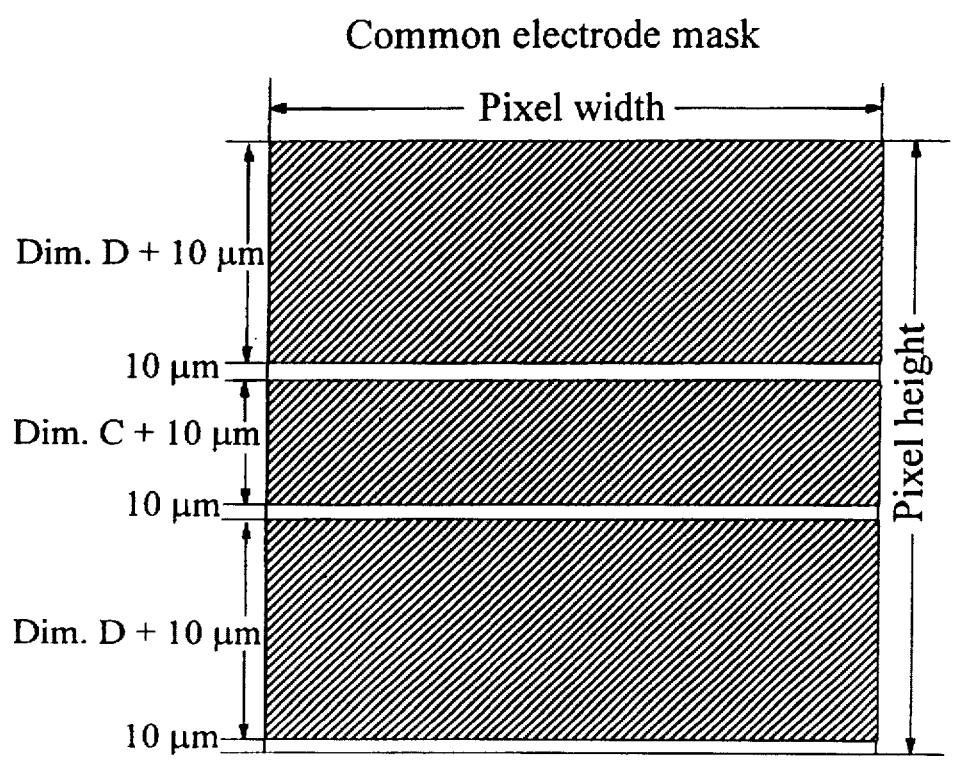
FIG. 29 is a plan view of the common level electrode mask used in the construction of the common transparent electrode layer of the preferred embodiment.

The second substrate of the display is laid out in the same manner as the first substrate but for different masks being used and the dispensing of the color filter layer. After the surface of the substrate has been thoroughly cleaned, a common metal layer, a common dielectric layer, a common transparent electrode layer and the various surface layers are laid down with the common metal mask as shown in FIG. 27, the common dielectric mask as shown in FIG. 28, and the common electrode mask as shown in FIG. 29.

Figure 30:
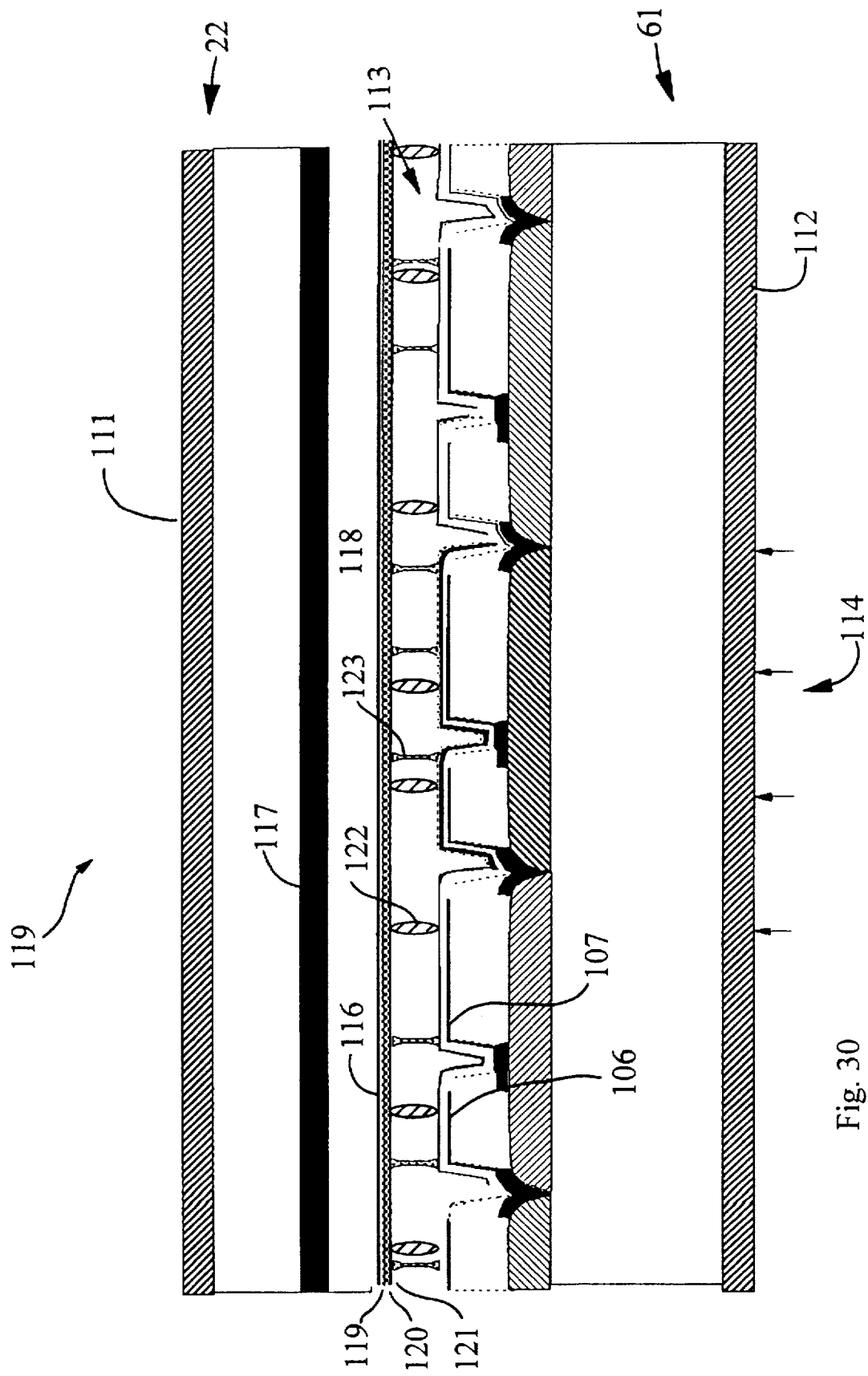
FIG. 30 is a cross-section of a pixel through the line A—A of FIG. 10.

Referring now to FIG. 30 there is shown a final cross-section 119 of a pixel of the display taken through the line A—A of FIG. 10. In order to better illustrate the preferred embodiment, the approximate scale of the cross-section has been magnified in the vertical direction.

This cross-section includes the upper 62 and lower 61 glass substrates as previously described. On each glass substrate is deposited polarizing film 111, 112, which, depending on the required driving mechanisms, can have either parallel or perpendicular polarizing axes with respect to one another.

Layers deposited on the substrates are designed to create a transparent electrode portion for the particular transparent area required, in addition to a supply means for delivering a voltage source to the transparent electrode so that the required electric field can be set up between the top substrate 62 and the bottom substrate 61, and so that the liquid crystal 113 sandwiched between the substrates, can be forced into its relevant bistable state.

As mentioned previously, the bistability is with respect to the liquid crystal's influence on the polarization of light. Hence, light 114 is shone through the panel by means of a backlight (not shown), and is polarized by the bottom substrate polarizer 112. It then has its polarization state changed depending on the bistable state of the liquid crystal 113, before passing through the second polarising film 111 which, depending on the required driving arrangement, may have its polarization axis at right angles to, or parallel to, the bottom substrate polariser 112. Hence, depending on the state of the crystal 113, which is preferably of a ferroelectric liquid crystal type, the light will be either blocked or transmitted by the combination of the polarizers 111, 112 and liquid crystal 113.

The stare of the liquid crystal 113 is altered, as previously mentioned, by setting up electric fields between the transparent electrodes of the top and bottom substrates. This is done primarily by means of intersecting portions of transparent electrodes. For example, a top common transparent electrode 116 and a bottom data transparent electrode 106, 107. These transparent electrodes comprise, approximately 0.7 μm thick of Indium Tin Oxide (ITO) connected to a 0.7 μm metal voltage supply line. The common level transparent layer 116 is connected to corresponding portions of common metal layer 117 which include the common metal lines 71–73 of FIG. 14. The data or segment level transparent layer e.g. 106, 107 is connected to corresponding portions of the data level metal layer which includes the data metal lines 75, 76 of FIG. 14.

The transparent common electrode layer 116 is insulated from an adjacent common metal electrode 117 by means of a common dielectric layer 118. Additionally, it is necessary to insulate the common transparent layer 116 from the liquid crystal itself. This insulation is provided by a 0.1 μm insulation layer 119 made up of Tantalum Pentoxide ($Ta_2O_5$). A 0.1 μm layer of Silicon Titanium Oxide ($SiTiO_x$) 120 is then provided to smooth out any irregularities in the surface of the substrate. An alignment layer 121 comprising approximately 0.02 μm of polyamide is then formed with the alignment layer being formed by laying down the polyanide layer and then rubbing the surface thereof in one direction with velvet, cloth, paper etc. As mentioned previously, the various layers are also replicated on the bottom substrate 61 with the addition of the color filter layer.

The two substrates 62, 61 are held apart by 1.5 μm glass spheres 122. These spheres are shown elongated due to the scaled dimensions of the panel. Sphere densities in the order of 100 spheres per square millimeter are appropriate. The substrates are held together by adhesive droplets 123, so that between the droplets 123 and the spheres 122, the panel is kept in a static equilibrium with the thickness of the liquid crystal being of the order of 1.5 μm, being the diameter of the spheres 122.

Sub-Pixel Dimensions

As mentioned previously, the display of images is normally in accordance with predetermined standards. For example, a standard used with CRT type displays in common use with computer terminals is to display images with a resolution of 1,280 pixels by 1,024 lines An image that is stored with reference to the above display format can be displayed on a variety of display sizes, in a similar manner that television displays come in a variety of display sizes and yet all display the same image. The difference is in the actual size of each pixel.

Figure 31:
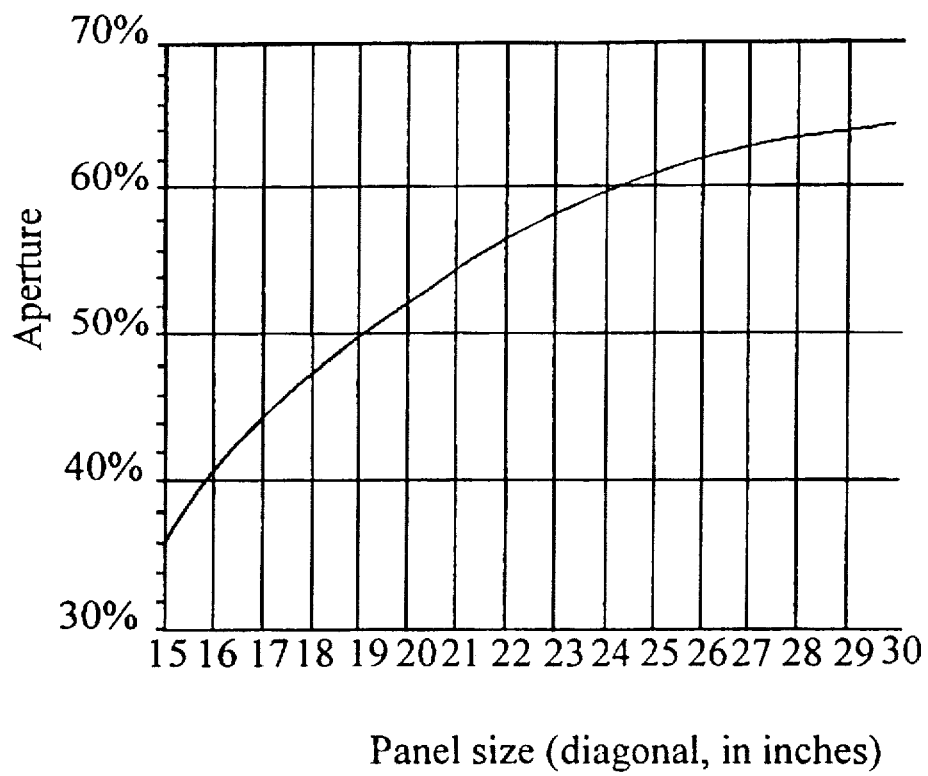
FIG. 31 illustrates a graph of the aperture of a color panel constructed in accordance with the preferred embodiment with respect to the panel size.

In the preferred embodiment, different sized pixels can be achieved by altering the area of the transparent electrode areas. With reference to FIG. 14, the dimensions A, B, C and D can be altered depending on the desired pixel size Preferably the width of the metal lines are kept constant at 20 µm although this width will be dependent on the manufacturing process used. Table A below shows the various sizes (in microns) of the dimensions A, B, C, D for different sized displays, with the measurement for the display measured along its diagonal and the dimensions of the relevant pixel areas shown to the nearest 0.1 micron. FIG. 31 illustrates a graph of the corresponding aperture ratio of the color FLCD display utilising the data set out in Table A.

TABLE A

Dimensions For Various Pixel Sizes

| Panel size Inches (cm) | Metal width (µm) | Dim. A (microns) | Dim. B (microns) | Dim. C (microns) | Dim. D (microns) |
|---|---|---|---|---|---|
| 15 (38) | 20.0 | 12.5 | 25.0 | 34.5 | 69.0 |
| 16 (40) | 20.0 | 14.2 | 28.4 | 37.6 | 75.2 |
| 17 (44) | 20.0 | 15.9 | 31.9 | 40.7 | 81.4 |
| 18 (44) | 20.0 | 17.7 | 35.3 | 43.8 | 87.6 |
| 19 (45) | 20.0 | 19.4 | 38.8 | 46.9 | 93.8 |
| 20 (51) | 20.0 | 21.1 | 42.2 | 50.0 | 100.0 |
| 21 (53) | 20.0 | 22.8 | 45.6 | 53.1 | 106.2 |
| 22 (56) | 20.0 | 24.5 | 49.1 | 56.2 | 112.4 |
| 23 (58) | 20.0 | 26.3 | 52.5 | 59.3 | 118.6 |
| 24 (61) | 20.0 | 28.0 | 56.0 | 62.4 | 124.8 |
| 25 (64) | 20.0 | 29.7 | 59.4 | 65.5 | 131.0 |
| 26 (66) | 20.0 | 31.4 | 62.9 | 68.6 | 137.2 |
| 27 (69) | 20.0 | 33.2 | 66.3 | 71.7 | 143.3 |
| 28 (71) | 20.0 | 34.9 | 69.7 | 74.8 | 149.5 |
| 29 (74) | 20.0 | 36.6 | 73.2 | 77.9 | 155.7 |
| 30 (76) | 20.0 | 38.3 | 76.6 | 81.0 | 161.9 |

The forgoing describes only two embodiments of the present invention. However, the invention is not limited thereto. For example, application to other forms of displays would be readily apparent to those skilled in the art. Additionally, modifications obvious to those skilled in the art can be made to the embodiments without departing from the scope of the invention. For example, the pixel display need not be a colour display as the system has equal application to monochrome displays. Additionally, as noted previously, the present invention is also applicable to other forms of display wherein it is desired to drive the display at multiple update rates.

What I claim is:

1. A discrete level display having a plurality of pixels, each said pixel having a plurality of drive lines and a plurality of common lines, said display having at least two pixel update states including:

a motion update state wherein a plurality of said common lines of said pixels are able to be driven in unison; and
   a refining update state wherein said common lines of said pixels are able to be driven independently.

2. A discrete level display as claimed in claim 1, wherein each pixel has a predetermined number of primary color components and said plurality of drive lines are divided into groups of drive lines for each primary color component.

3. A discrete level display as claimed in claim 2, wherein the drive lines for each primary color component are connected to sub-pixel portions of each said pixel and wherein when said display is in a motion update state, said drive lines drive said sub-pixel portions such that a ratio of the areas or luminance of which form a substantially binary ratio.

4. A discrete level display as claimed in claim 3, wherein, when said display is in said refining update state, each of said drive lines and corresponding said plurality of common lines drive an area or luminance having a substantially binary ratio.

5. A discrete level display as claimed in claim 2, wherein said drive lines for each primary color component are allocated substantially in accordance with the luminance of said primary color component.

6. A discrete level display as claimed in claim 3, wherein said sub-pixel portions of said pixels to which said drive lines connect are substantially optically centered.

7. A discrete level display as claimed in claim 2, wherein said primary color components are red, green and blue.

8. A discrete level display as claimed in any one of claims 1 to 7, wherein said display is a ferro electric liquid crystal display.

9. A discrete level display as claimed in any one of claims 1 to 7, wherein said display is a back light display.

10. A method of updating a discrete level display, the display having a plurality of pixels, each pixel having a plurality of drive lines and a plurality of common lines, said method comprising the steps of:

entering a motion update state when motion in the pixels of an input image in excess of a first predetermined minimum motion is detected and driving a plurality of the common lines corresponding to the pixels in unison; and entering a refinement update state when motion less than a second predetermined minimum motion is detected and refreshing the pixels by driving the common lines independently.

11. A method of updating a discrete level display as claimed in claim 10, further comprising the step of entering a background refresh state of driving all the pixels of the display once said refreshing is completed.

12. A method as claimed in claim 10 or 11, wherein the pixels comprise a plurality of independently illuminable areas and the number of the areas able to be independently illuminated in the motion update state is less than the number of the areas able to be independently illuminated in the refinement update state.

13. A discrete level display comprising:

a plurality of pixels each having connected thereto a plurality of drive lines and a plurality of common lines;
   means for driving a plurality of said common lines in unison to define a motion update state of said display; and
   means for driving a plurality of said common lines independently to define a refining update state of said display.

14. A memory characteristic display having a plurality of pixels, each said pixel having a plurality of sub-pixels having a different scale, and having a plurality of common lines and drive lines each provided corresponding to each said sub-pixel, said display comprising:

- means for entering a first mode of simultaneously driving each of said plurality of common lines connected to each said pixel when motion occurs in an image input to said display;
- means for entering a second mode of independently driving each of said plurality of common lines connected to each said pixel updated in the first mode when an amount of motion of the input image is below the predetermined threshold; and
- means for entering a third mode of individually driving all of said plurality of common lines connected to said plurality of pixels in a determined sequence from the time when the motion of the input image has ceased until a time when the motion occurs again.

15. A memory characteristic display as claimed in claim 14, wherein one of said plurality of common lines is connected to one of said plurality of sub-pixels which is provided on a plurality of lines, and wherein another of said plurality of common lines is connected to one of said plurality of sub-pixels which is provided between said plurality of lines.

16. A memory characteristic display as claimed in claim 14 or 15, wherein said display is ferroelectric liquid crystal display.

* * * * *

UNITED STATES PATENT AND TRADEMARK OFFICE
CERTIFICATE OF CORRECTION

PATENT NO. : 5,793,345  Page 1 of 4

DATED : August 11, 1998

INVENTOR(S) : KIA SILVERBROOK

It is certified that error appears in the above-identified patent and that said Letters Patent is hereby corrected as shown below:

COLUMN 1

Line 44, "race." should read --rate.--.

COLUMN 3

Line 24, "independently," should read --independently.--

COLUMN 4

Line 28, "ment:" should read --ment;--.
    Line 46, "size;" should read --size.--
    Line 51, "can" should read --can be--.
    Line 64, "colors" should read --color's--.

COLUMN 5

Line 10, "mid" should read --mid---.
    Line 13, "mid point" should read --midpoint--.
    Line 21, "half" should read --halve--.

COLUMN 6

Line 33, "halved." should read --is halved.--.
    Line 36, "colour." should read --color.--.

UNITED STATES PATENT AND TRADEMARK OFFICE
CERTIFICATE OF CORRECTION

PATENT NO. : 5,793,345　　　　　　　　Page 2 of 4

DATED　　　 : August 11, 1998

INVENTOR(S): KIA SILVERBROOK

It is certified that error appears in the above-identified patent and that said Letters Patent is hereby corrected as shown below:

COLUMN 7

```
Line 12, "Colour" should read --Color--.
Line 39, "portions" should read --portions,--.
```

COLUMN 8

```
Line 24, "Finally" should read --Finally,--.
Line 66, "is" should be deleted.
```

COLUMN 9

```
Line 2,  "PLCD" should read --FLCD--.
Line 17, "utilised" should read --utilized--.
Line 19, "utilised" should read --utilized--.
Line 52, "colour" should read --color--; and
    "30" should be deleted.
Line 64, "area," should read --area.--.
```

COLUMN 10

```
Line 1,  "colour" should read --color--.
Line 2,  "colours" should read --colors--.
Line 9,  "colour" should read --color--.
Line 11, "colours." should read --colors.--.
Line 48, "colour " should read --color--.
```

UNITED STATES PATENT AND TRADEMARK OFFICE
CERTIFICATE OF CORRECTION

PATENT NO. : 5,793,345          Page 3 of 4

DATED       : August 11, 1998

INVENTOR(S): KIA SILVERBROOK

It is certified that error appears in the above-identified patent and that said Letters Patent is hereby corrected as shown below:

COLUMN 11

Line 33, "Hence" should read --Hence,--.
    Line 56, "FIG. 30" should read --FIG. 30,--.

COLUMN 12

Line 23, "stare" should read --state--.
    Line 35, "layer" should read --layer,--.
    Line 48, "polyanide" should read --polyamide--.
    Line 50, "paper etc." should read --paper, etc.--.

COLUMN 13

Line 2, "lines An" should read --lines.  An--.
    Line 10, "size" should read --size.--.
    Line 43, "forgoing" should read --foregoing--.
    Line 50, "colour" should read --color--.

UNITED STATES PATENT AND TRADEMARK OFFICE
CERTIFICATE OF CORRECTION

PATENT NO. : 5,793,345

DATED : August 11, 1998

INVENTOR(S) : KIA SILVERBROOK

It is certified that error appears in the above-identified patent and that said Letters Patent is hereby corrected as shown below:

COLUMN 14

Line 26, "ferro electric" should read --ferroelectric--.

Signed and Sealed this

Fourth Day of May, 1999

Attest:

Q. TODD DICKINSON

Attesting Officer

Acting Commissioner of Patents and Trademarks